(12) United States Patent
Lagos et al.

(10) Patent No.: US 11,983,202 B2
(45) Date of Patent: May 14, 2024

(54) COMPUTER-IMPLEMENTED METHOD FOR IMPROVING CLASSIFICATION OF LABELS AND CATEGORIES OF A DATABASE

(71) Applicant: Naver Corporation, Gyeonggi-do (KR)

(72) Inventors: Nikolaos Lagos, Grenoble (FR); Ioan Calapodescu, Grenoble (FR); JinHee Lee, Seoul (KR); Salah Ait-Mokhtar, MontBonnot-Saint-Martin (FR)

(73) Assignee: Naver Corporation (KR)

( * ) Notice: Subject to any disclaimer, the term of this patent is extended or adjusted under 35 U.S.C. 154(b) by 22 days.

(21) Appl. No.: 17/734,153

(22) Filed: May 2, 2022

(65) Prior Publication Data

US 2023/0004581 A1    Jan. 5, 2023

Related U.S. Application Data

(60) Provisional application No. 63/216,070, filed on Jun. 29, 2021.

(51) Int. Cl.
*G06F 7/00* (2006.01)
*G06F 16/28* (2019.01)
*G06N 5/022* (2023.01)

(52) U.S. Cl.
CPC .......... *G06F 16/285* (2019.01); *G06N 5/022* (2013.01)

(58) Field of Classification Search
CPC .............................. G06F 16/285; G06N 5/022
USPC .................................................. 707/600–899
See application file for complete search history.

(56) References Cited

U.S. PATENT DOCUMENTS

2019/0122077 A1* 4/2019 Tsishkou .............. G05D 1/0231

OTHER PUBLICATIONS

Babbar, Rohit; Partalas, Ioannis; Gaussier, Eric; and Amini, Massih R. "On Flat versus Hierarchical Classification in Large-Scale Taxonomies". In Proceedings of the 26th International Conference on Neural Information Processing Systems, vol. 2 (Lake Tahoe, Nevada) (NIPS'13), 2013.

Blum, Avrim; and Mitchell, Tom. "Combining Labeled and Unlabeled Data with Co-Training". In Proceedings of the Eleventh Annual Conference on Computational Learning Theory (Madison, Wisconsin, USA) (COLT' 98), 1998.

Cerri, Ricardo; Barros, Rodrigo C; De Carvalho, André C. P. L. F; and Jin, Yaochu. "Reduction Strategies for Hierarchical Multi-Label Classification in Protein Function Prediction". BMC Bioinformatics 17, No. 1, 2016.

(Continued)

*Primary Examiner* — Isaac M Woo

(57) ABSTRACT

There is disclosed a method for using a computer to enable correction of misclassified labels in a database. The computer initially applies a dataset (including labels pointing respectively to categories) to a first classifier, which includes a first loss function. Pursuant to the initial application, the computer determines that one or more labels have been misclassified. Responsive to such determination, the computer changes the first loss function to a second loss function to form a second classifier including the second loss function. The computer then applies the dataset to the second classifier for enabling correction of the one or more misclassified labels.

14 Claims, 11 Drawing Sheets

(56) References Cited

OTHER PUBLICATIONS

Chu, Peng; Bian, Xiao; Liu, Shaopeng; and Ling, Haibin. "Feature Space Augmentation for Long-Tailed Data". In Computer Vision—ECCV 2020, edited by Andrea Vedaldi, Horst Bischof, Thomas Brox, and Jan-Michael Frahm, 12374:694-710, Lecture Notes in Computer Science, Cham: Springer International Publishing, 2020.
Cui, Yin; Jia, Menglin; Lin, Tsung-Yi; Song, Yang; and Belongie, Serge. "Class-Balanced Loss Based on Effective Number of Samples". In 2019 IEEE/CVF Conference on Computer Vision and Pattern Recognition (CVPR), 2019.
Feng, Shou; Fu, Ping; and Zheng, Wenbin. "A Hierarchical Multi-Label Classification Algorithm for Gene Function Prediction". Algorithms 10, No. 4, 2017.
Giunchiglia, Eleonora; and Lukasiewicz, Thomas. "Coherent Hierarchical Multi-Label Classification Networks", 34th Conference on Neural Information Processing Systems (NeurIPS 2020), Vancouver, Canada, 2020.
Ha, Jung-Woo; Pyo, Hyuna; and Kim, Jeonghee. "Large-Scale Item Categorization in e-Commerce Using Multiple Recurrent Neural Networks". In Proceedings of the 22nd ACM SIGKDD International Conference on Knowledge Discovery and Data Mining, pp. 107-115, San Francisco California USA, ACM, 2016.
He, Tieke; Yin, Hongzhi; Chen, Zhenyu; Zhou, Xiaofang; Sadiq, Shazia; and Luo, Bin. "A Spatial-Temporal Topic Model for the Semantic Annotation of POIs in LBSNs". ACM Transactions on Intelligent Systems and Technology vol. 8, No. 1, article 12, Jul. 2016.
Kingma, Diederik P; and Ba, Jimmy. "Adam: A Method for Stochastic Optimization". Published on arXiv.org as 1412.6980v9, Jan. 30, 2017.
Krumm, John; and Rouhana, Dany. "Placer: Semantic Place Labels from Diary Data". In Proceedings of the 2013 ACM International Joint Conference on Pervasive and Ubiquitous Computing, pp. 163-172, Zurich Switzerland, ACM, 2013.
Kulmanov, Maxat; Khan, Mohammed Asif; and Hoehndorf, Robert. "DeepGO: Predicting Protein Functions from Sequence and Interactions Using a Deep Ontology-Aware Classifier". Bioinformatics 34(4), pp. 660-668, 2017.
Lagos, Nikolaos; Ait-Mokhtar, Salah; and Calapodescu, Ioan. "Point-Of-Interest Semantic Tag Completion in a Global Crowdsourced Search-and-Discovery Database". In ECAI 2020—24th European Conference on Artificial Intelligence, Santiago de Compostela, Spain,—Including 10th Conference on Prestigious Applications of Artificial Intelligence PAIS 2020.
Lin, Tsung-Yi; Goyal, Priya; Girshick, Ross; He, Kaiming; and Dollár, Piotr. "Focal Loss for Dense Object Detection". Published on arXiv.org as 1708.02002v1, Aug. 7, 2017.
Liu, Shaopeng; Jifan, Yu; Juanzi, Li; and Lei, Hou. "Geographical Information Enhanced POI Hierarchical Classification". In Web Information Systems and Applications, Guojun Wang, Xuemin Lin, James Hendler, Wei Song, Zhuoming Xu, and Genggeng Liu (Eds.). Springer International Publishing, Cham, pp. 108-119, 2020.
Masera, Luca; and Blanzieri, Enrico. "AWX: An Integrated Approach to Hierarchical-Multilabel Classification", available on the Internet at ecmlpkdd2018.org/wp-content/uploads/2018/09/165.pdf, 2019.
Ott, Myle; Edunov, Sergey; Baevski, Alexei; Fan, Angela; Gross, Sam; Ng, Nathan; Grangier, David; and Auli, Michael. "Fairseq: A Fast, Extensible Toolkit for Sequence Modeling". Published on arXiv.org as 1904.01038v1, Apr. 1, 2019.
Park, Sungjoon; Byun, Jeongmin; Baek, Sion; Cho, Yongseok; Oh, Alice. "Subword-level Word Vector Representations for Korean". In Proceedings of the 56th Annual Meeting of the ACL, pp. 2429-2438, 2018.
Pedregosa, Fabian; Varoquaux, Gael; Gramfort, Alexandre; Michel, Vincent; Thirion, Bertrand; Grisel, Olivier; Blondel, Mathieu; et al. "Scikit-Learn: Machine Learning in Python". Journal of Machine Learning Research 12, pp. 2825-2830, 2011.
Sennrich, Rico; Haddow, Barry; and Birch, Alexandra. "Neural Machine Translation of Rare Words with Subword Units". In Proceedings of the 54th Annual Meeting of the Association for Computational Linguistics (vol. 1: Long Papers), pp. 1715-1725, Berlin, Germany: Association for Computational Linguistics, 2016.
Silla, Carlos N; and Freitas, Alex A. "A Survey of Hierarchical Classification across Different Application Domains". Published on the Internet at cs.kent.ac.uk/people/staff/aaf/pub_papers.dir/DMKD-J-2010-Silla.pdf, 2010.
Sun, Aixin; and Lim, Ee-Peng. "Hierarchical Text Classification and Evaluation". In Proceedings 2001 IEEE International Conference on Data Mining, pp. 521-528. San Jose, CA, USA: IEEE Comput. Soc, 2001.
Wang, Yan; Qin, Zongxu; Pang, Jun; Zhang, Yang; and Xin, Jin. "Semantic Annotation for Places in LBSN through Graph Embedding". In Proceedings of the 2017 ACM on Conference on Information and Knowledge Management, pp. 2343-2346. Singapore Singapore: ACM, 2017.
Wehrmann, Jônatas; Cerri, Ricardo; and Barros, Rodrigo C. "Hierarchical Multi-Label Classification Networks", Proceedings of the 35th International Conference on Machine Learning, Stockholm, Sweden, PMLR 80, 2018.
Yarowsky, David. "Unsupervised Word Sense Disambiguation Rivaling Supervised Methods". In Proceedings of the 33rd Annual Meeting on Association for Computational Linguistics, pp. 189-196. Cambridge, Massachusetts: Association for Computational Linguistics, 1995.
Ye, Mao; Shou, Dong; Lee, Wang-Chien; Yin, Peifeng; and Janowicz, Krzysztof. "On the Semantic Annotation of Places in Location-Based Social Networks". In Proceedings of the 17th ACM SIGKDD International Conference on Knowledge Discovery and Data Mining—KDD '11, 520. San Diego, California, USA: ACM Press, 2011.
Zhou, Jingbo; Gou, Shan; Hu, Renjun; Zhang, Dongxiang; Xu, Jin; Jiang, Airong; Li, Ying; and Xiong, Hui. "A Collaborative Learning Framework to Tag Refinement for Points of Interest". In Proceedings of the 25th ACM SIGKDD International Conference on Knowledge Discovery & Data Mining, pp. 1752-1761. Anchorage AK USA: ACM, 2019.

\* cited by examiner

Method 1: Identify candidate joker classes

Result: J the set of candidate joker classes
Data: Dataset of the misclassifications of the base learner:
$I=\{t'_i, \hat{t}_i, p(\hat{t}_i)\}_{i=1}^n$
Parameters: m:maximum depth, pt:probability threshold, s:support, rt:ratio threshold, l:hierarchy level
C:dictionary with category/sample counts;
D:dictionary with candidate joker class/sample counts;
for $l=1$ to $m$ do
    foreach $i \in I$ do
        $C[t'_i] \leftarrow C[t'_i] + 1$;
        if $t'_i.prefix\_path\_of(\hat{t}_i)$ & $p(\hat{t}_i) > pt$ then
            $D[t'_i] = D[t'_i] + 1$;
        end
    end
    foreach $t' \in C$ do
        if $C[t'] > s_l$ & $D[t']/C[t'] > rt_l$ then
            $J \leftarrow J \cup \{t'\}$;
        end
    end
end
return $J$

FIG. 11

COMPUTER-IMPLEMENTED METHOD FOR IMPROVING CLASSIFICATION OF LABELS AND CATEGORIES OF A DATABASE

PRIORITY INFORMATION

The present application claims priority, under 35 USC §119(e), from U.S. Provisional Patent Application, Ser. No. 63/216,070, filed on Jun. 29, 2021. The entire content of U.S. Provisional Patent Application, Ser. No. 63/216,070, filed on Jun. 29, 2021, is hereby incorporated by reference.

FIELD

The present disclosure relates to improved database development in which a computer is used to implement robust learning in the presence of annotations with under-specified hierarchical labels.

BACKGROUND

Several production databases, such as Google Maps and Naver Maps, store information regarding points-of-interest (POIs), i.e., places that one might find interesting. In one approach, metadata, including tags or labels corresponding with one or more POI categories, are generally added, removed or modified in these databases. This metadata may be used not only to guide humans, but also as input data to several applications such as recommender systems and/or trip planners. However, in real-life applications, labels for POIs may be incomplete or even missing for unpopular or newly-established POIs.

Machine learning based supervised category prediction has been proposed as a solution to impute missing labels. However, as recognized, it is unrealistic to count on the existence of a perfectly annotated training set. This may be due to the inadequate input of labels by using either automatic techniques (e.g., mining user comments), which necessarily comprises errors, or due to human error (e.g., caused by humans who often fail to annotate POIs comprehensively), especially when there are thousands of categories from which to select. Accordingly, training annotations may be noisy.

Inadequate input of labels results in the presence of under-specified hierarchical labels. That is, for a given label hierarchy, a fully-specified label is one that provides a path from the root node to the most specific correct node. By contrast, an under-specified label has a path that terminates at a category found at higher levels of the hierarchy. This results in under-represented and over-represented categories. For instance, several POIs are tagged with a path terminating close to the top of the hierarchy e.g., "Restaurant||Korean Food", while the actual correct path terminates at a lower level e.g., "Restaurant||Korean Food||Seafood-||Sliced Raw Fish||Saebyeok Raw fish". In that case, "Restaurant||Korean Food" could be considered a candidate of an over-represented class and "Restaurant||Korean Food||Seafood||Sliced Raw Fish||Saebyeok Raw fish" a candidate of an under-represented class. It would be desirable to provide a computer-implemented process permitting robust machine learning in the presence of under-developed hierarchical labels.

Other known teachings may relate to the understanding of the disclosed embodiments. Most of the work regarding POI classification has taken place in the context of location based social networks. Two particular approaches are worth noting:

The first one requires access to check-in data and uses such data as input to a prediction model. This includes, for instance, POI unique identifiers, user unique identifiers, the time and duration of the check-in, the number of check-ins, the latitude/longitude of the user's position, and sometimes users' demographic information (e.g., age range, gender). Based on this information, much of the existing work, attempts to categorize POIs in very coarse-grained categories (e.g., home vs. work, or nightlife/bar vs. restaurant) with the number of categories to predict ranging from 3 to 15. In addition to check-ins, others have used more fine-grained information about the POIs. Yet others use POI name and address tokens or, more particularly, token embeddings pre-computed on a domain-specific corpus.

Recognizing that collecting personal information may be difficult for a large number of POIs, other works are based on POI metadata only. One approach focuses on increasing the POI classifier's coverage by using only the POI name, location, and time of opening attributes. Yet another approach uses only POI names and locations as input to their model. In addition, they propose a voting ensemble of hierarchical classifiers to predict leaf categories.

Turning to classification approaches, flat classification approaches ignore the hierarchical relations between categories and treat leaf categories as an independent set of labels (i.e., each class is independent of other classes). While flat classification approaches are easy to implement, they tend to have worse results than hierarchical approaches when labels are organized in a large taxonomy. In contrast, hierarchical classification (HC) systems are particularly well suited for predicting a hierarchically organized path of labels. Hierarchical classifiers are usually divided into local and global approaches: Local approaches learn multiple independent classifiers with each classifier specializing with respect to each node, parent node or hierarchy level. Global approaches consist of a single model able to map samples to their corresponding category paths as a whole.

State-of-art performance has been recently achieved with hybrid approaches combining local and global paradigms. Wehrmann et al., *Hierarchical Multi-Label Classification Networks* (Proceedings of the 35th International Conference on Machine Learning, PMLR 80:5075-5084, [2018]) ["Wehrmann et."] discloses a classifier that is trained with both local and global losses. Another approach proposes coherent multi-label classification networks where labels predicted by the local and global classifiers are hierarchically consistent. It is not believed that designers of hierarchical classifiers have addressed the problems arising as a result of under-specified hierarchical category paths.

SUMMARY

In embodiments there is disclosed one or more processors for improving classification of labels and categories of a database stored in memory. The one or more processors applying both a subset of a set of labels and a subset of a set of categories of the database stored in the memory to a first classifier for classifying the subset of labels, and analysing a label in the subset of labels of the database stored in the memory based on the classification. Based on the classification analysis, the one or more processors changing the first loss function of the first classifier to a second loss function to form a second classifier including the second loss function, and applying both the subset of labels and the subset of categories to the second classifier for classifying the subset of labels with respect to the subset of categories of the database stored in the memory for improving its classification of labels and categories.

BRIEF DESCRIPTION OF THE DRAWINGS

The drawings are only for purposes of illustrating various embodiments and are not to be construed as limiting, wherein:

FIG. 11 sets forth a method in pseudo computer code for identifying candidate joker classes.

In the drawings, reference numbers may be reused to identify similar and/or identical elements.

DESCRIPTION

A. Platform for System Implementation

Figure 1:
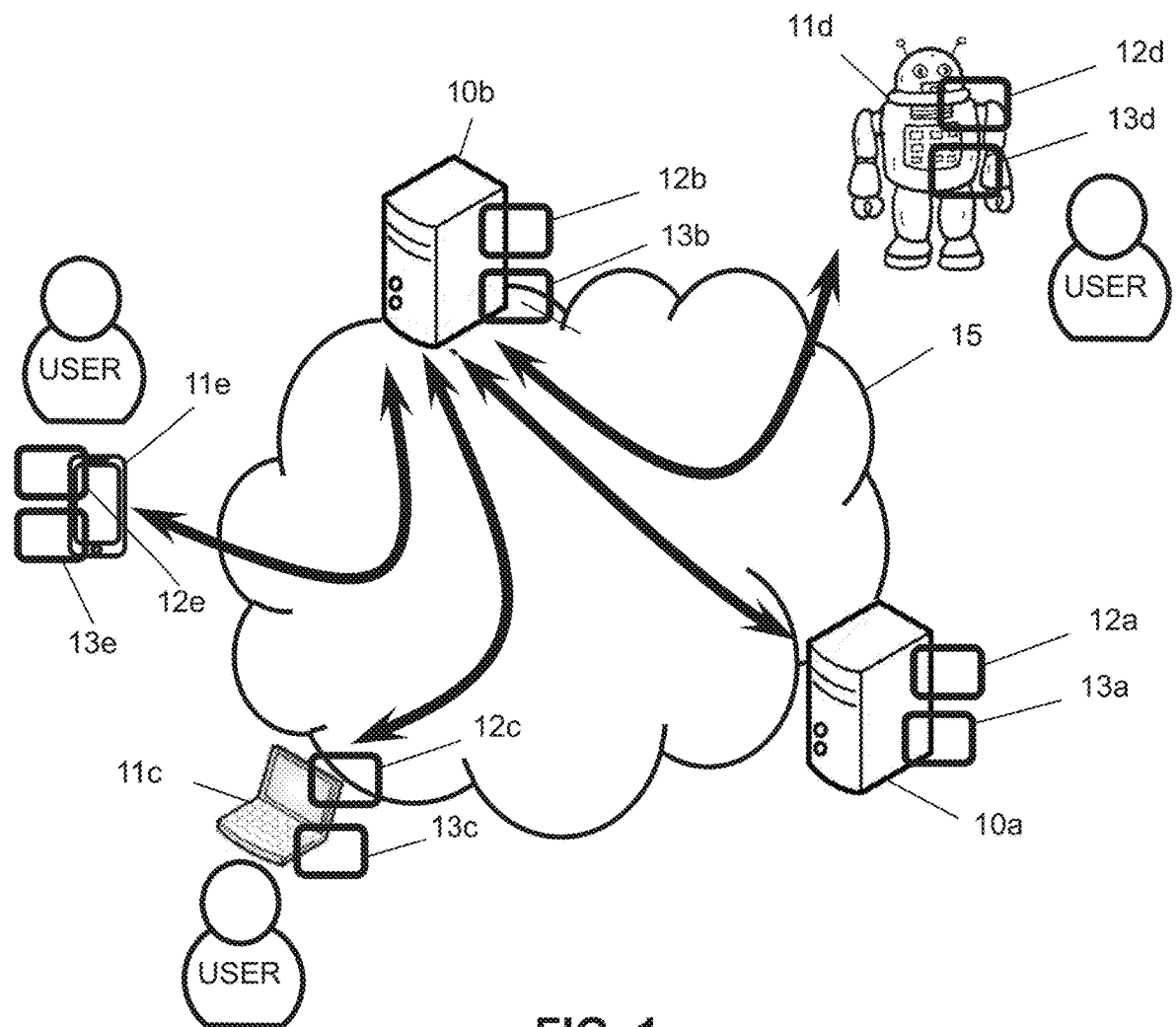
FIG. 1 illustrates a schematic diagram of a hardware platform for performing the disclosed methods for improving classification of labels and categories of a database.

Referring to FIG. 1, a hardware platform is illustrated for performing the disclosed methods for improving classification of labels and categories of a database. More specifically, FIG. 1 illustrates a hardware platform of a system that permits robust learning in the presence of annotations with under-specified hierarchical labels is illustrated. The platform includes a first server 10a and a second server 10b. In one embodiment, the first server 10a is a dataset server for storing a training dataset (stored in memory 13a) and the second server 10b is a training server for implementing a method for training a model (stored in memory 13b), the training dataset including labels pointing to categories. In other embodiments, servers 10a and 10b may be merged or have reversed functionality.

The servers 10a and 10b are typically remote computer equipment connected to an extended network 15 such as the Internet for data exchange. The platform of FIG. 1 advantageously comprises one or more items of client equipment 11, which may be any workstation 11c, robot 11d, or mobile device 11e (which are also connected to network 15), preferably separate from the servers 10a, 10b, but possibly being merged with one and/or the other thereof. Each server 10a, 10b and client equipment 11c, 11d, 11e comprises, respectively, processors 12a, 12b, 12c, 12d, 12e, and optionally computer memories 13a, 13b, 13c, 13d, 13e. The operators (i.e., "users") of client equipment 11 are typically "clients" in the commercial meaning of the term, of the service provider operating the first and/or second servers 10a, 10b.

B. System Functionality

B.1 Analysis

In an exemplary development approach, a flat POI classifier, of the type disclosed in Lagos et al., *Point-Of-Interest Semantic Tag Completion in a Global Crowdsourced Search-and-Discovery Database* (ECAI 2020 -24th European Conference on Artificial Intelligence, 29 Aug.-8 Sep. 2020) ["Lagos et al."], was implemented. Then a development dataset, including 828,000 POIs and 4093 unique category paths (only paths appearing as the label of at least one POI were counted) was provided. Each POI is labelled with exactly one path and the maximum depth of a corresponding categorization hierarchy is five. The exemplary hierarchy employed is very fine grained. For instance, 70 sub-categories of a Pizza category are located at the third level of the hierarchy.

Figure 6:
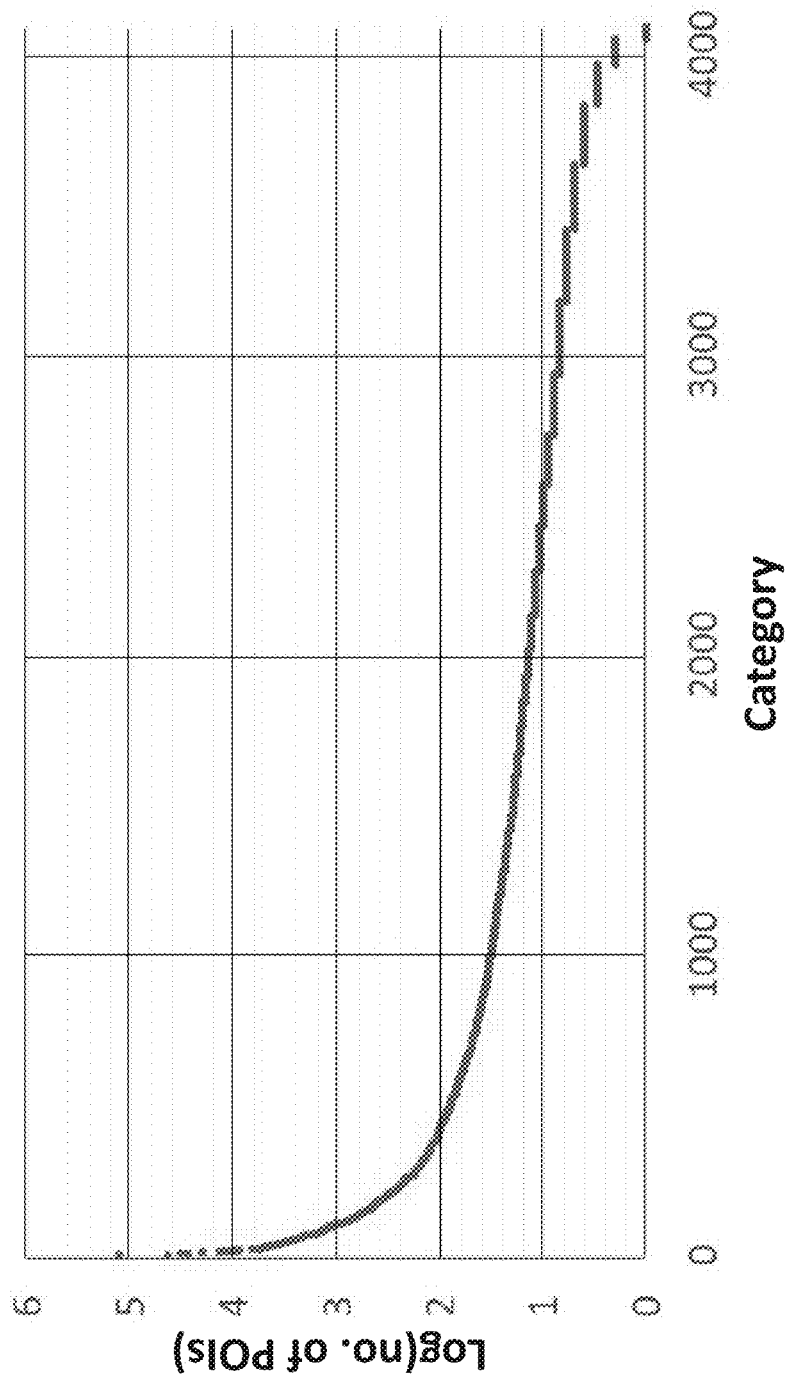
FIG. 6 is a graph illustrating the distribution of the data used in the dataset of the disclosed embodiments.

The development dataset is heavily imbalanced in terms of the number of POI instances attributed to each category, as illustrated FIG. 6. For instance, the top ten categories have more than 40% of the POIs attributed to them, while 461 categories have fewer than 5 POIs, resulting in a very long queue of sparsely represented categories. To generate training and test data, stratified sampling was used. Consequently, the 828,000 POIs were proportionally allocated into 70% for training, 20% for development, and 10% for testing purposes.

Figure 2:
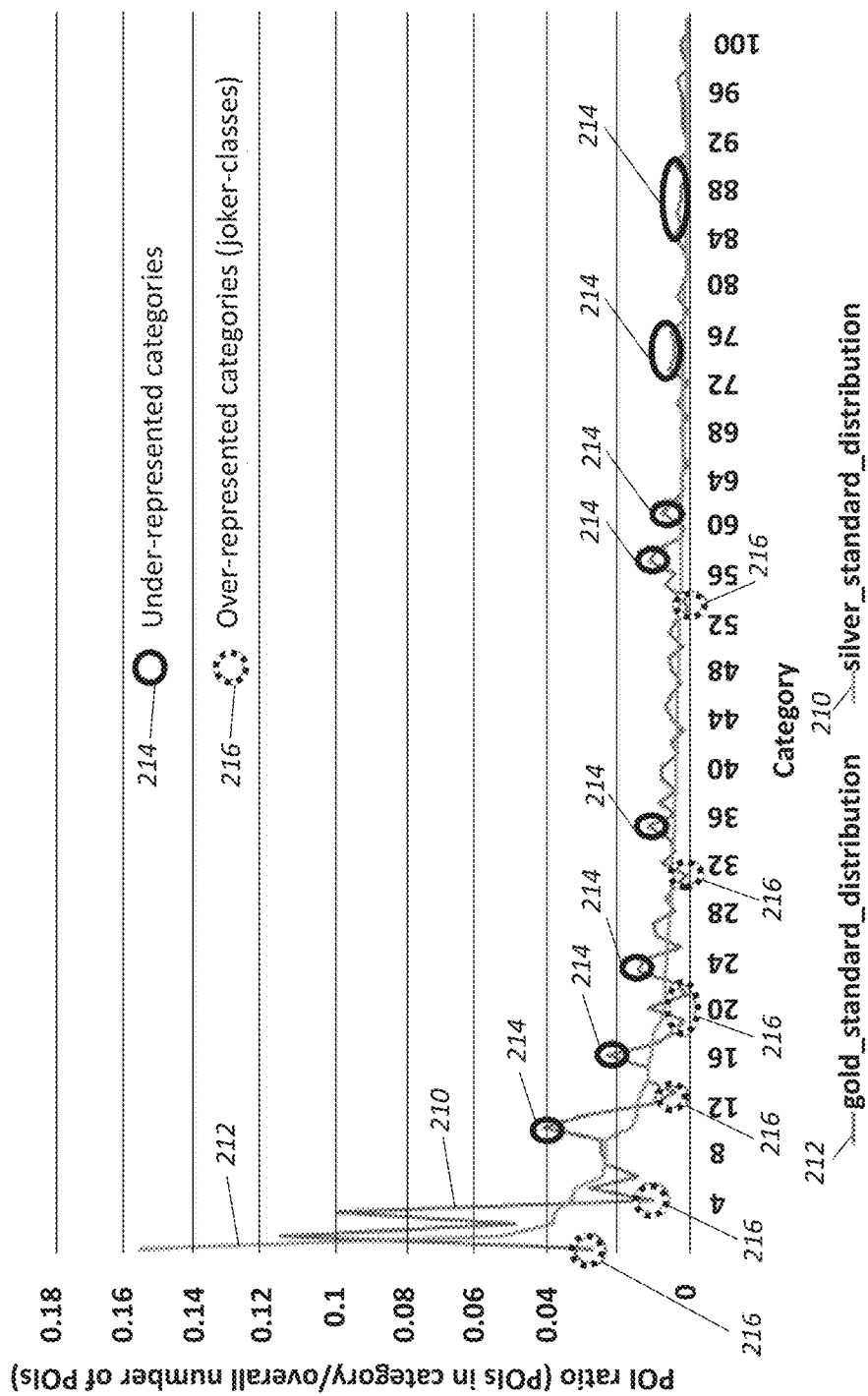
FIG. 2 is a graph illustrating the distribution of the data in a manually annotated dataset before (silver standard) and after verification (gold standard), for 100 POI categories.

In the present description, the test dataset is referred to as a "silver standard", as labels are under-specified for a part of the POIs. By contrast, a gold standard dataset includes 1000 POIs that were carefully verified. More particularly, FIG. 2, illustrates the distribution of the data in a manually annotated dataset before (silver standard 210) and after verification (gold standard 212), for the top 100 most popular categories. Examples of under-represented categories 214 and over-represented categories 216 are highlighted. Differences between the two distributions are mainly due to POIs having been annotated with under-specified labels. As will appear, FIG. 2 specifically illustrates how the distribution of the top one hundred most popular categories changes after verification of the manually annotated dataset.

Figure 3:
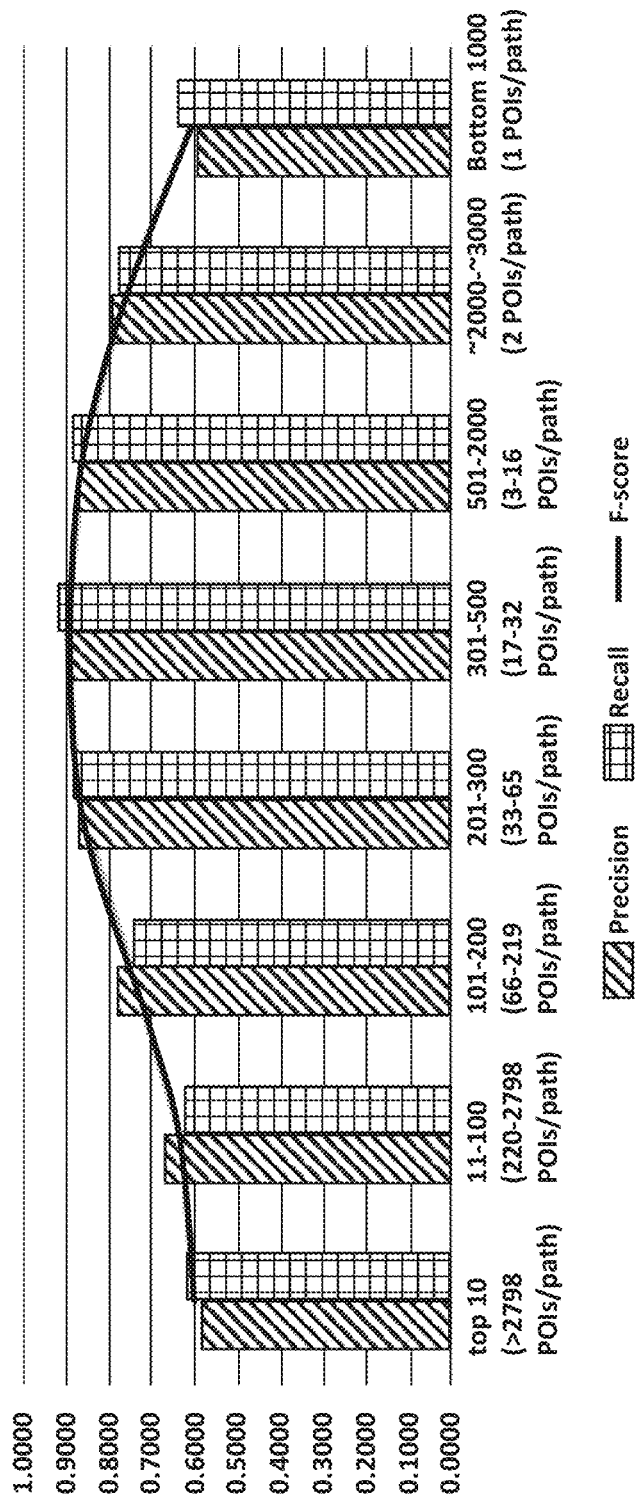
FIG. 3 is a bar chart illustrating the performance of the system in relation to the number of POIs attributed to corresponding category paths.

Pursuant to development, errors of which the system is capable were qualified prior to deployment. Also, in view of the very long tail of the development dataset, the behavior of the system on the corresponding POIs was considered. Referring to FIG. 3, the performance of the system in relation to the number of POIs attributed to corresponding category paths is illustrated. As demonstrated by FIG. 3, the system performs very well on category paths in the middle of the range, and comparatively well for paths with very few POIs. However, performance was lower than expected for paths that were heavily populated and deteriorating when only one POI was related to a specific category path.

To further qualify errors, a set of 1000 misclassifications was extracted for further analysis. This sample was representative of the prediction probabilities one could find in the misclassifications of the development set. That is, if 15% of the misclassifications on the development set had a probability of over 0.9, then the same ratio was maintained for the extracted set. Details of the analysis are presented in Table 1.

TABLE 1

| Probability | Correct(%) | Acceptable(%) |
|---|---|---|
| >0.9 | 66.63 | 7.62 |
| 0.7-0.9 | 32 | 7-12 |
| 0.4-0.7 | 13-15 | 31-40 |
| <0.4 | <3 | <5 |

Table 1 represents a verification of disagreements between the silver test dataset and the prediction generated by the above-mentioned initial flat classifier. The model associated with the system is able to correct the human annotations at high probability threshold levels, or recommend correct alternative tags. The resulting verified dataset is considered as the gold standard in the rest of the paper.

It follows from Table 1 that at high probability thresholds a resulting classification model actually identifies mistakes of the human annotators. At a probability of over 0.9 this accounted for identification of almost two thirds of the misclassifications, while when between 0.7 and 0.9, for almost one third. In addition, one third of the tags in the range 0.4-0.7 were considered acceptable i.e., the prediction would have been good enough to include it in a production database. Most of the time this amounted to categories semantically very close to each other such as ||Cafe, Dessert||Cafe and ||Cafe, Dessert (where "||" denotes a sub-level in a hierarchy and the root category "Restaurant" is omitted for clarity). It also follows from Table 1 that in the case when the probability is below 0.4, misclassifications are actual errors.

The above analysis (in conjunction with the following description) leads to several exemplary observations:

It is advantageous to both minimize under-specified labels and to predict a fully-specified label whenever possible;

Setting a probability threshold of 0.4, as demonstrated in Section B.3.(vi)(a) below, permits a gain of points in micro-F1; and The classification model explored above may be used advantageously to not only impute labels for new POIs, but to curate existing annotations.

In practice, the above-verified dataset is used as the gold standard for the embodiments. Additionally, it is noted that the distribution of the gold standard is different from that of the silver standard, as several POIs initially attributed to over-represented classes were re-attributed to more specific category paths, as shown below in Table 2, and, advantageously, to a large number of long-tail classes. Table 2 represents the percentage of POIs attributed to categories lower in the hierarchy after verification, for some heavily populated categories. The symbol "||" indicates a sub-level in the hierarchy, and the symbol "*" is used to denote the percentage of alternative tags.

TABLE 2

| Category | Re-attributed POIs(%) |
|---|---|
| ||Korean Food | 80.29 (1.46*) |
| ||Cafe, Dessert[5] | 59.3* |
| ||Cafe, Dessert||Cafe | 0.0 |
| ||Korean Food||Meat, Food | 15.69 |

TABLE 2-continued

| Category | Re-attributed POIs(%) |
|---|---|
| ||Korean Food||Meat, Food||Grilled Pork | 0.0 |
| ||Bar||Pub | 0.91 (0.3*) |
| ... | ... |
| ||Korean Snack[6] | 50 (42.3*) |
| ... | ... |
| Restaurant | 100 |
| ||Night meal | 71.43 |

B.2 Assessment

In the embodiments, a POI p is represented as p={x, y}={$x^{(1)}$, $x^{(2)}$, y} where x is a vector representing the collection of POI's name, $x^{(1)}$, address, $x^{(2)}$, attributes, as well as a label y, representing a hierarchical category path.

Figure 4:
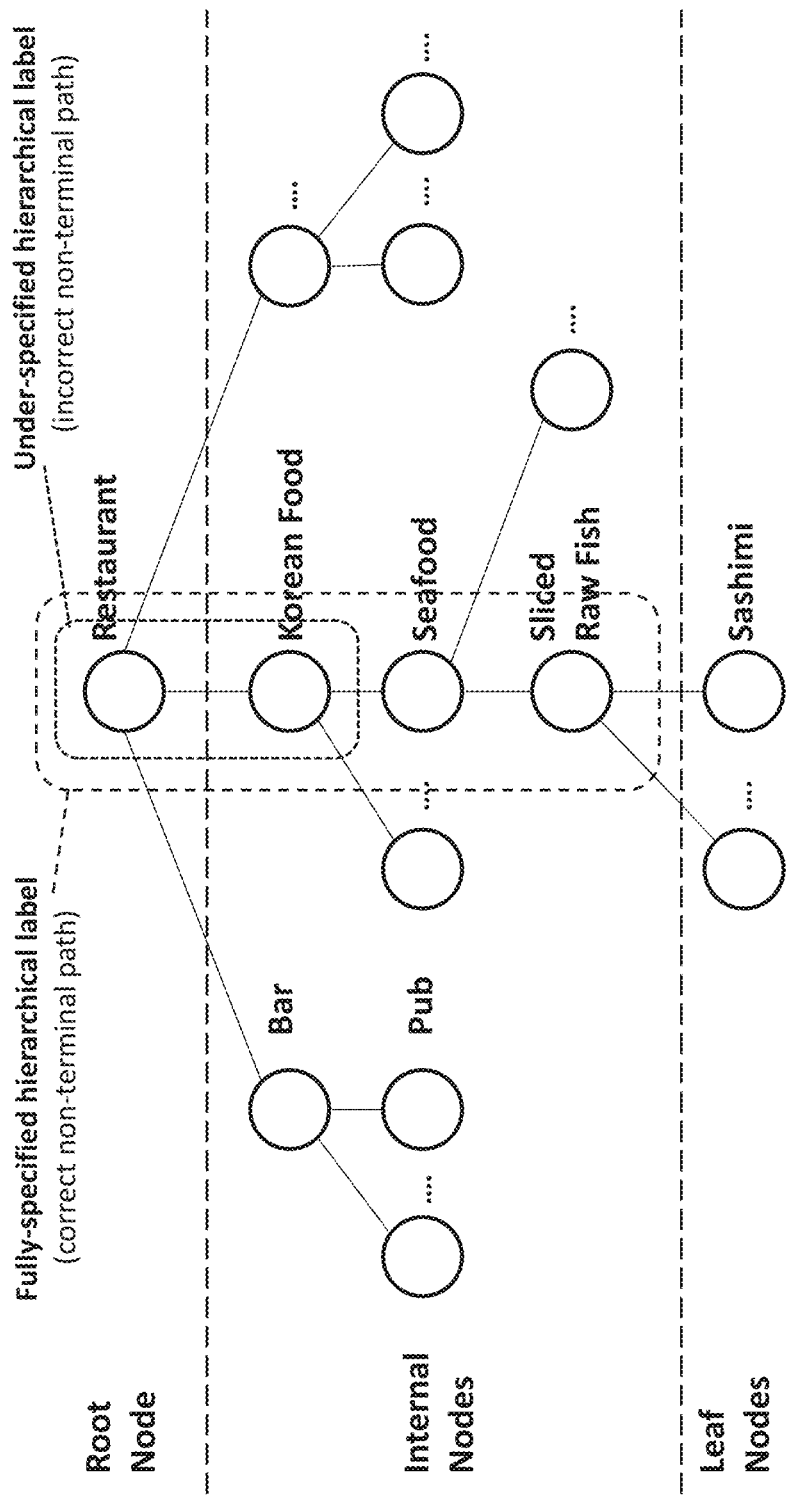
FIG. 4 is a schematic diagram illustrating an example of under-specified and fully-specified hierarchical labels.

A tree structured hierarchy of categories T=(C, E) where C={$c_0^0$, ..., $c_n^k$} is the set of n pre-defined categories with a maximum depth of k, such that E={($c_i^h$, $c_j^{h+1}$)∈ C|$c_i^h \prec c_j^{h+1}$, h≤k}, where h is an index indicating the level of the hierarchy, namely hierarchy depth, and "$\prec$" denotes the sub-category-of relation. For instance, given the root-to-leaf of categories "Restaurant||Korean Food||Seafood-||Sliced Raw Fish||Sashimi", as shown in FIG. 4, and $c_i^h$ is the path "Restaurant||Korean Food" then $c_j^{h+1}$ would be the path "Restaurant||Korean Food||Seafood".

Given T, y should ideally represent a fully-specified path of categories t=($c^0$, $c^1$, ..., $c^m$). In at least one embodiment, correct non-terminal paths (where m<k) may exist, meaning that a fully-specified correct path does not necessarily have to include categories up to the leaf nodes of the hierarchy, but could instead terminate at an internal node. Continuing consideration of the above example, the path "Restaurant||Korean Food||Seafood||Sliced Raw Fish" could be correct if the corresponding POI served several different types of sliced raw fish. In addition, in a real-world case, it has been found that observed paths t'=($c^0$, $c^1$, ..., $c^z$), in the training data, may be under-specified i.e., z<m, and thus incorrect. For instance, t' could be "Restaurant||Korean Food". At least one of the disclosed embodiments is directed toward a classifier responsive to the above data characteristics.

B.3 Exemplary Approaches

B.3.(i) Overview

To allow robust learning in the presence of annotations with under-specified hierarchical labels, the exemplary approaches described below include: (a) developing a hybrid hierarchical classifier that combines one global and potentially several local classifiers using standard categorical cross-entropy losses; (b) automatically detecting problematic categories, including candidate "joker classes" (i.e., over-represented categories), based on the misclassifications of the classifier of step (a); (c) introducing a weight to the global classifier's loss and re-training the model from scratch. The weight specifically penalizes misclassifications having shorter category paths than the ones found in the corresponding human annotations, while accordingly it assigns lower cost to misclassifications having longer category paths.

Figure 5:
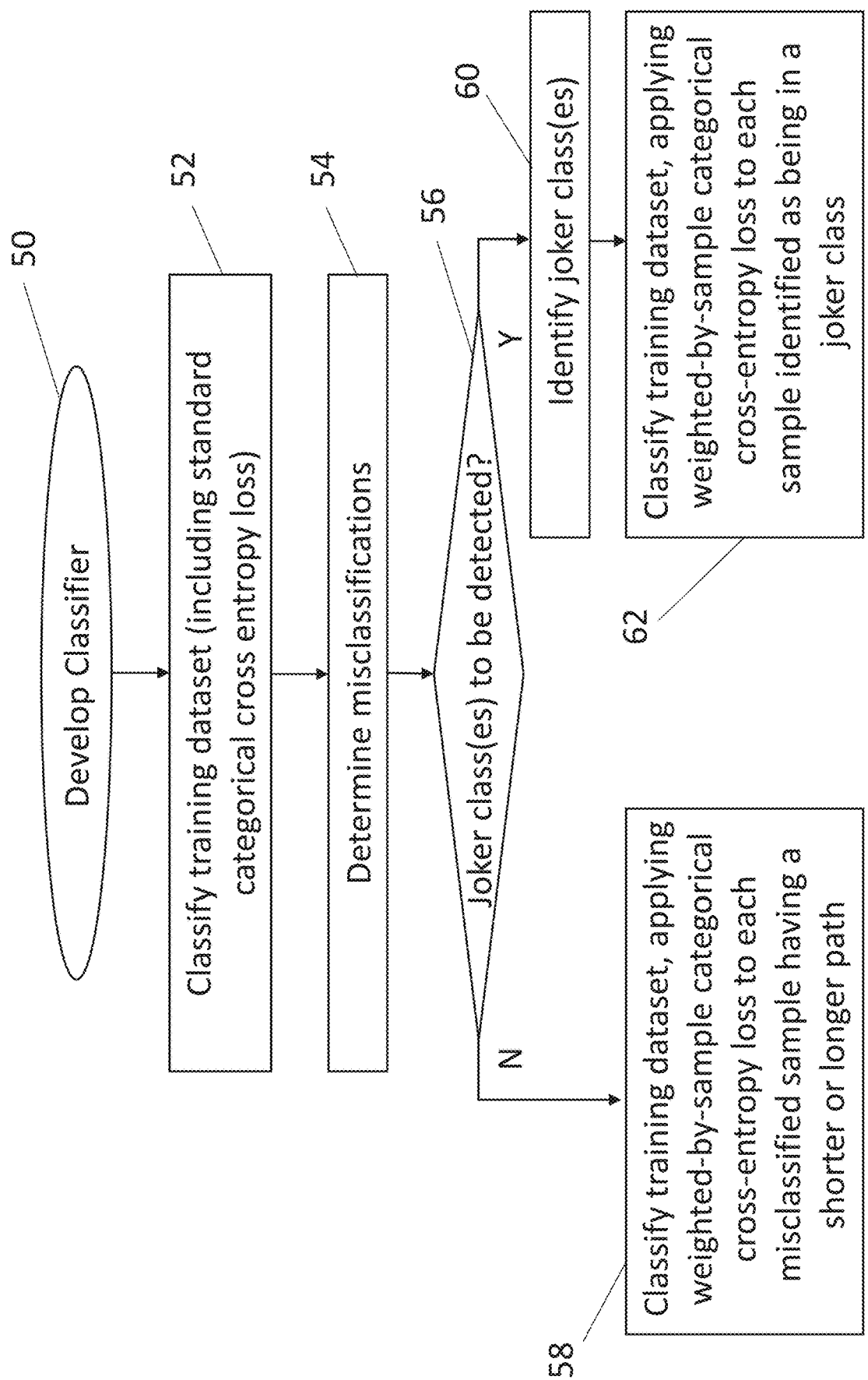
FIG. 5 is a flow chart relating to exemplary approaches of the disclosed embodiments.

Referring to FIG. 5, a flow chart relating generally to exemplary approaches described below in Sections B.3.(iii) and B.3.(iv) is shown. In particular, at 50, each approach includes using the one or more processors 12 (FIG. 1) to develop a classifier. At 52, a first training model, including a standard categorical cross-entropy loss function, is used to classify the training dataset. In accordance with the description above, at 54, misclassifications resulting from the classification at 52 are determined.

As described in further detail below, additional classification is performed in one of two modes with a first mode being agnostic to joker class detection and a second mode being responsive to joker class detection. At 56, the mode to be used is set.

In the first mode, at 58, no detection of joker classes is attempted and the training dataset is classified with a second training model. The second training model employs a weighted-by-sample categorical cross-entropy loss function (instead of a standard categorical cross-entropy loss function) and the weighted-by-sample categorical cross-entropy loss function is applied to each category path (designated below as "$a_{longer}$" and "$a_{shorter}$").

In the second mode, at 60, each joker class is identified. In one embodiment, a computer program of the type disclosed in detail below with reference to Method 1 shown in FIG. 11, is used to identify each joker class. At 62, classification is performed in the same manner as 58, except that the weighted-by-sample categorical cross-entropy loss function is applied to each joker class rather than each category path.

B.3.(ii) Hierarchical Classification Model

Wehrmann et al. has shown that a hierarchical classifier operating both local and global optimization has significant advantages over a hierarchical classifier operating with just one of the two approaches. In view of such showing, a multiple-output deep neural network including the following was implemented: one local output per hierarchical level, with a corresponding local loss function for the classes in the corresponding level, and one global output for the final category path. The input of the first local classifier is composed of the initial inputs only, i.e., the LSTM (Long Term Short Memory) embeddings of the POI attributes. Each local classifier thereafter has as input the concatenation of the initial inputs and the intermediate embedding representing the feature space of the previous local classifiers i.e., the last dense layer, before the output layer, of the previous local classifier. Dense layers are activated with a non-linear function (such as a rectified linear unit). The global classifier has as inputs the embedding of the last dense layer of the last local classifier, which as highlighted by Wehrmann et al., is the cumulative information of the feature space of all local classifiers, concatenated with the initial inputs.

The final loss is the sum of the global output loss $\mathcal{L}_G$ and all local output losses $\mathcal{L} = \mathcal{L}_G + \Sigma_{h=1}^{r} \mathcal{L}_L^h$, where r≤k. To make the classes mutually exclusive for each hierarchical level, the standard categorical cross-entropy loss for each one of $\mathcal{L}_L^h$ and $\mathcal{L}_G$ is employed.

To account for non-terminal paths i.e., observed paths that do not terminate at a leaf node but at an internal one, a special category token to denote when the end of a non-terminal path has been reached is used. In contrast to the approach of Wehrmann et al., the embodiments permit r<k, thus effectively allowing the implementation of different networks that incrementally cover more levels of the hierarchy, until an optimal depth is found.

B.3.(iii) Joker Class-Agnostic Class

In at least one embodiment, under-specified category paths are accounted for by penalizing more misclassifications with shorter paths than the ones observed in the training data, when that shorter path is shared by both the prediction and the observed label, than misclassifications with longer paths. In addition, it is desirable to penalize the latter case less than the rest of the errors, i.e., when the prediction and observed label do not share, at least in part, a common path.

For instance, assume that y represents the path t'="Restaurant||Korean Food||Seafood". If ŷ denotes the prediction with shorter path $\hat{t}$="Restaurant||Korean Food", then this prediction would be penalized more than if it represented the one with longer path "Restaurant||Korean Food-||Seafood||Sliced Raw Fish". Specifically, let $a_{\hat{y}_i, y_i}$ denote the cost associated with assigning the label ŷ to the sample i that has an observed label y. Denoting $a_{shorter}$ the cost of predicting a shorter path than the observed one and $a_{longer}$ the cost of predicting a longer path, then $a_{longer} < a_{shorter}$. Both $a_{longer}$ and $a_{shorter}$ may be set empirically. Accordingly, in at least one embodiment, $\mathcal{L}_G$ is changed from the standard categorical cross-entropy loss function to the following weighted-by-sample categorical cross-entropy loss function:

$$\mathcal{L}'_G = \frac{1}{N} \sum_{i=1}^{N} a_{\hat{y}_i, y_i} \mathcal{L}_{G,i}$$

where $\mathcal{L}_{G,i}$ is the standard global categorical cross-entropy loss function for sample i and, $$a_{\hat{y}_i, y_i} = \begin{cases} a_{shorter}, & \text{if } \hat{t}_i. \text{ prefix\_path\_of } (t'_i) \\ a_{longer}, & \text{if } t'_i. \text{ prefix\_path\_of } (\hat{t}_i) \cdot \\ 1, & \text{otherwise} \end{cases}$$

$\hat{t}$ is the path corresponding to the $\hat{y}_i$ prediction and $t_i'$ is the observed path corresponding to $y_i$. The prefix_path_of function indicates a "strict" prefix, i.e., the two paths cannot be identical.

B.3.(iv) Joker Class-Specific Cost

The global loss defined in Section B.3.(iii) above applies to all category paths. However, only a small set of unique paths concentrate the majority of real incorrect misclassifications, the ones referred to above as joker classes. By applying the cost in a joker class-agnostic manner, over training samples related to non-joker classes may be over-punished. That is, it would appear that the model might be made less confident for some correct annotations.

To tackle this issue, the embodiment proposes to automatically identify candidate joker classes based on the misclassifications of the initial hierarchical classification model and apply the $a_{longer}$ and $a_{shorter}$ costs introduced in the previous section only to samples that have labels corresponding to these classes. More specifically, the following assumptions are employed:

Although the hierarchical classification model, i.e., the above-mentioned base learner, is not optimal, it is still able to predict the correct category for the majority of the samples for which the model is most confident. This is viewed as an indication of confidence the probability the model assigns to a prediction.

As found in a preliminary qualitative analysis of the development set, the majority of the misclassifications for which the embodied base learner is very confident (i.e., where the probability >0.9) are related to predictions that have longer paths than the ones found in the corresponding manual annotations. So, finding frequent paths related to misclassifications with a high prediction probability, may be an indication that they correspond to joker classes.

Based on the above, finding candidate joker classes amounts to identifying category paths that are frequently misclassified by the model with a high certainty. This is demonstrated by Method 1 shown in FIG. 11 of pseudo computer code.

In Method 1 shown in FIG. 11, the minimum support s, i.e., the minimum number of samples that should be related to a category, and the maximum hierarchy depth is defined. The maximum hierarchy depth is related to the nature of at least one exemplary problem: as most joker classes tend to be located at higher levels of the hierarchy by definition, the benefit of Method 1 becomes potentially less important as misclassifications lower in the hierarchy are considered. In one experiment, the maximum depth was set to 3 and the minimum support to 100. In the same experiment, the probability threshold is set as greater than 0.9 and the ratio threshold is set to the median of all the categories remaining after the previous steps are applied, resulting in 22 candidate joker classes.

B.3.(v) Exemplary Models and Related Implementation Details

The following exemplary models were used to evaluate the disclosed system:

Base: The embodiments use the flat classifier of Lagos et al. as a baseline. In detail, an exemplary implementation includes an architecture with one hidden dense layer, followed by a dropout layer, and a softmax output layer. A Rectified Linear Unit serves as the activation function of the hidden layer. The dropout rate is set to 0.3. The loss used for the baseline is categorical cross entropy. An early stopping criterion is used for the training based on a pre-defined threshold that takes into account the delta of the loss between two consecutive epochs. The maximum number of epochs is set to 50. Both POI attributes are considered as sequential features with a length of 50. For the LSTM layer, the dimensions of the embedding layervector space are set to 128 and the number of the LSTM hidden units to 128. The LSTM has recurrent dropout rate of 0.3. The rest of the models described below share the same hyper-parameter values.

Hcls: "Hcls" stands for the hierarchical model described above in Section B.3.(ii). In Table 3 shown below only the best performing model (namely the one taking into account only the second level of the hierarchy) is described in detail. An ablation study is included in Section B.3.(vi)(c) below. For the Hcls model, a dropout layer is inserted after each dense layer with each dense layer being added in order to represent a hierarchical categorization level; otherwise, the rest of the implementation details for the Hcls model are the same as for the baseline.

Focal,cb: Given the fact that a lot of POIs are re-attributed in the gold dataset to long-tail categories, state-of-art approaches that counter the effect of a skewed data distribution by adjusting the weights of the samples from the small classes in the loss function have been considered. In that context, focal-loss (Lin et al., *Focal Loss for Dense Object Detection*, IEEE International Conference on Computer Vision [ICCV] 2999-3007 [2017]) as well as its combination with class-balanced loss have shown the most promising results recently (Cui et al., *Class-Balanced Loss Based on Effective Number of Samples*, IEEE/CVF Conference on Computer Vision and Pattern Recognition [CVPR] 9260-9269 [2019]). Focal loss adds a modulating parameter $\gamma$ to the cross-entropy loss to allow focusing on long tail samples. Class balanced loss offers an alternative to using inverse class frequency, by introducing the concept of the class effective number via the hyperparameter $\beta$, which is used to calculate the weight of each class in the loss term. For the present evaluation, the categorical cross-entropy loss of the global output with these losses were replaced. That is, the modulating parameter $\gamma$ of focal loss was set at 1.0 and the $\beta$ parameter of the class-balanced loss at 0.2, after performing a grid search with step size of 0.1.

C$\mathcal{L}$: This corresponds with the cost-based loss described in Section B.3.(iii), which is agnostic to the classes that the samples belong. The cost for misclassifications that have longer paths than the manually added labels is set to 0.5 and the cost for misclassifications with shorter paths is set to 1.4.

C$\mathcal{J}\mathcal{L}$: This corresponds with the cost-based, joker-class specific loss described in Section B.3.(iv). The same costs are used for each one of the C$\mathcal{L}$ and C$\mathcal{L}\mathcal{J}$ models. A detailed ablation study showing how the costs influence the performance of the model is provided below.

In the embodiments, experiments were performed on a single GPU (Graphics Processing Unit) instance (1 GPU with 16GB VRAM, 4 CPUs, with 256GB RAM). Training was performed with a batch size of 128. An Adam optimizer was used with conventionally recommended default parameters, along with standard macro and micro metrics for the evaluation calculated using the scikit-learn package.

B.3.(vi) Exemplary Results

B.3.(vi)(a) Overview of Exemplary Results

The following Table 3 illustrates average performance (%) over 5 runs on the silver and gold standards. Best results per dataset are in bold. Standard deviation is also reported. Hcls+C$\mathcal{J}\mathcal{L}_{1.4,\ 0.5}$ performs well on both the silver and gold standards (most balanced performance). Hcls+C$\mathcal{J}\mathcal{L}_{5.0,\ 0.5}$ has the best overall performance on the gold standard. (⇑) denotes the delta in F1 between the two models above and the baseline on the gold standard, while (↑) denotes the delta in F1 to the hierarchical classifier, Hcls.

TABLE 3

| Dataset | Silver standard | | | Gold standard | | |
|---|---|---|---|---|---|---|
| Model | Metric | | | | | |
| | Micro-prec. | Micro-rec. | Micro-F1 | Micro-prec. | Micro-rec. | Micro-F1 |
| Base | 70.41 (±0.27) | 63.78 (±0.26) | 66.93 (±0.2) | 46.57 (±2.02) | 32.62 (±0.47) | 38.36 (±0.88) |
| Hcls | 72.85 (±0.26) | 63.90 (±0.26) | 68.08 (±0.05) | 50.32 (±1.14) | 31.99 (±0.46) | 39.11 (±0.58) |
| Hcls + Focal | 72.64 (±0.18) | 63.59 (±0.23) | 67.81 (±0.06) | 51.39 (±0.85) | 32.41 (±0.45) | 39.75 (±0.51) |
| Hcls + Focal-cb | 72.96 (±0.26) | 63.30 (±0.31) | 67.79 (±0.07) | 50.99 (±0.73) | 32.00 (±0.84) | 39.32 (±0.79) |
| Hcls + C$\mathcal{L}$ | 73.27 (±0.41) | 62.90 (±0.59) | 67.69 (±0.22) | 52.67 (±0.51) | 31.94 (±1.00) | 39.76 (±0.78) |
| Hcls + CJ$\mathcal{L}_{1.4,0.5}$ | 73.34 (±0.4) | 63.37 (±0.27) | 67.99 (±0.17) | 53.60 (±1.17) | 33.51 (±0.26) | 41.23 (±0.4) (↑2.12) (⇑2.87) |

TABLE 3-continued

| Dataset | Silver standard | | | Gold standard | | |
|---|---|---|---|---|---|---|
| Model | | | Metric | | | |
| Hcls + CJ$\mathcal{L}_{1.4,-}$ | 73.70 (±0.17) | 62.97 (±0.18) | 67.91 (±0.05) | 53.67 (±1.64) | 32.31 (±0.34) | 40.34 (±0.70) |
| Hcls + CJ$\mathcal{L}_{-,0.5}$ | 72.84 (±0.30) | 63.93 (±0.28) | 68.09 (±0.03) | 51.41 (±1.71) | 33.22 (±0.91) | 40.36 (±1.01) |
| Hcls + CJ$\mathcal{L}_{5.0,0.5}$ | 73.58 (±0.57) | 59.09 (±0.37) | 65.54 (±0.43) | 62.62 (±0.99) | 33.04 (±0.77) | 43.25 (±0.56) (↑4.14) (14.89) |
| | Macro-prec. | Macro-rec. | Macro-F1 | Macro-prec. | Macro-rec. | Macro-F1 |
| Base | 79.18 (±1.00) | 80.38 (±0.86) | 78.72 (±0.91) | 47.75 (±1.6) | 37.80 (±1.39) | 39.82 (±1.33) |
| Hcls | 80.29 (±0.18) | 82.23 (±0.51) | 80.08 (±0.32) | 49.66 (±1.69) | 38.38 (±1.10) | 40.92 (±1.33) |
| Hcls + Focal | 79.77 (±1.12) | 81.11 (±0.61) | 79.19 (±0.62) | 49.10 (±1.63) | 38.34 (±0.72) | 40.86 (±0.59) |
| Hcls + Focal-cb | 80.23 (±0.69) | 82.01 (±0.58) | 79.83 (±0.39) | 49.34 (±0.83) | 38.40 (±0.86) | 40.77 (±0.78) |
| Hcls + C$\mathcal{L}$ | 80.50 (±0.36) | 82.89 (±0.18) | 80.51 (±0.29) | 50.60 (±1.5) | 40.87 (±1.4) | 43.08 (±1.04) |
| Hcls + CJ$\mathcal{L}_{1.4,0.5}$ | 80.72 (±0.2) | 83.46 (±0.29) | 80.87 (±0.22) | 51.04 (±0.92) | 40.54 (±0.51) | 42.98 (±0.41) (↑2.06) (13.16) |
| Hcls + CJ$\mathcal{L}_{1.4,-}$ | 80.65 (±0.13) | 83.10 (±0.22) | 80.67 (±0.09) | 52.12 (±0.77) | 41.48 (±0.82) | 43.93 (±0.74) |
| Hcls + CJ$\mathcal{L}_{-,0.5}$ | 80.76 (±0.14) | 83.50 (±0.43) | 80.90 (±0.14) | 49.94 (±0.67) | 40.37 (±0.21) | 42.57 (±0.36) |
| Hcls + CJ$\mathcal{L}_{5.0,0.5}$ | 80.34 (±0.48) | 83.37 (±0.39) | 80.55 (±0.42) | 51.04 (±1.66) | 41.50 (±1.45) | 43.80 (±1.51) (↑2.88) (13.98) |

B.3.(vi)(b) Assessment of Exemplary Results

Referring to Table 3, the models of the embodiments achieve the best results with respect to the gold standard. An improvement of 2.87 points in micro-F1 compared to the baseline and 2.12 points compared to the initial hierarchical model for the Hcls+C$\mathcal{J}$ $\mathcal{L}_{1.4, 0.5}$ model is observed. The improvement reaches 3.16 and 2.06 points respectively in macro-F1. It is noted that the absolute scores may seem quite low, however, the gold standard consists exclusively of a subset of examples that the preliminary flat model fails to classify correctly as per the silver dataset, thus being very difficult to categorize. Hcls+C$\mathcal{J}$ $\mathcal{L}_{1.4, 0.5}$ performs better than the class-agnostic model, Hcls+C$\mathcal{L}$, in terms of micro-F1. However, Hcls+C$\mathcal{L}$ is comparable, if not slightly better (by 0.1%), in macro-F1.

Considering the results further, Hcls+C$\mathcal{L}$ applies the costs to all misclassifications, implicitly pushing the model to predict long-tail categories in a stronger manner than in the case of Hcls+C$\mathcal{J}$ $\mathcal{L}_{1.4, 0.5}$. Because of that, more POIs from head categories—most heavily populated categories found at the head, i.e., the left-most part of the data distribution of FIG. 6, are wrongly misclassified, resulting in the drop in micro-F1. To some extent, the additional POIs attributed to long-tail categories (i.e., less heavily populated categories) smooth out this difference in macro-F1. However, Hcls+C$\mathcal{J}$ $\mathcal{L}_{1.4, 0.5}$ has better overall performance.

On the silver standard, the Hcls+C$\mathcal{J}$ $\mathcal{L}_{1.4, 0.5}$ model achieves better results than the no-cost models in terms of macro-F1, gaining 2.15 points compared to the baseline and 0.79 points to the initial hierarchical model, Hcls. This may be due to long-tail POIs being predicted more often. On the other hand, the Hcls model has comparable (or even slightly better) micro-F1 to the Hcls+C$\mathcal{J}$ $\mathcal{L}_{1.4, 0.5}$ model (0.09 points decrease). This is somewhat expected since the silver standard shares the same issue of joker classes with the training data. The results on the gold standard, where the Hcls+C$\mathcal{J}$ $\mathcal{L}_{1.4, 0.5}$ model has significantly better scores than the Hcls one, is also a strong indication of that.

Surprisingly, the Hcls+focal-cb model does not have significantly better scores when compared to the initial Hcls model on the gold standard. This is in contrast to the results of the Base+focal-cb model, as shown in Section B.3.(vi)(b) below, which outperforms the baseline as expected, since it tends to favor long-tail rather than head categories. Detailed scores of all flat classifier-based models are included in Section B.3.(vi)(c) below. The absolute scores for the flat based models are lower than in the hierarchical case.

Further assessment of the impact of misclassification costs and of selecting different sets of joker classes follows. All of the following results reported are three-run averages.

Figure 7:
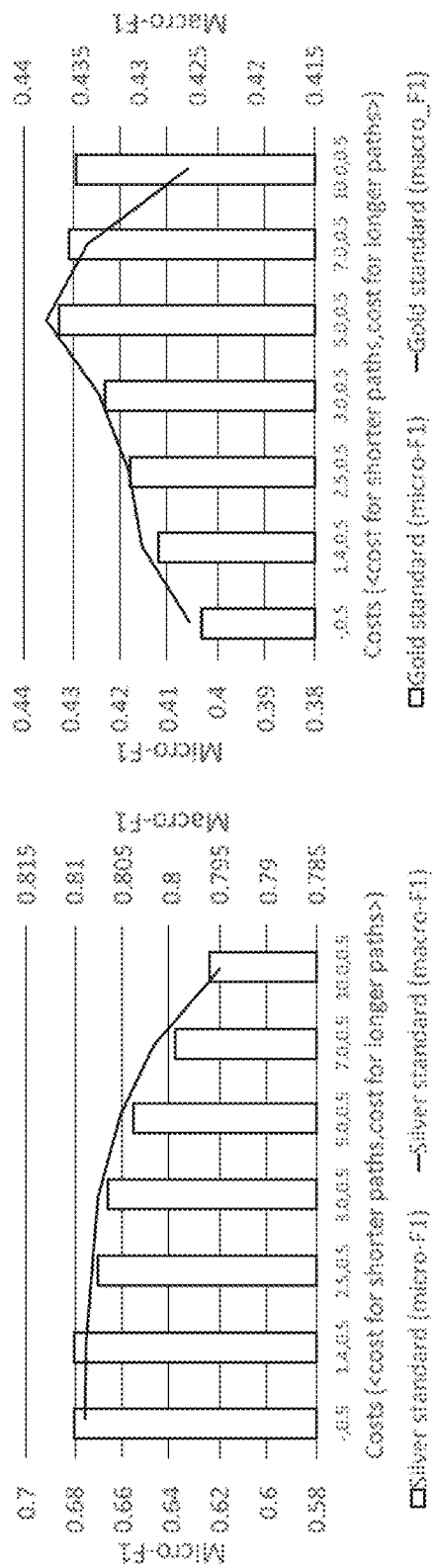
FIG. 7 includes bar graphs illustrating F1 scores for different cost values where misclassifications are related to predicting shorter paths than the ones in the training data of the disclosed embodiments.
Figure 8:
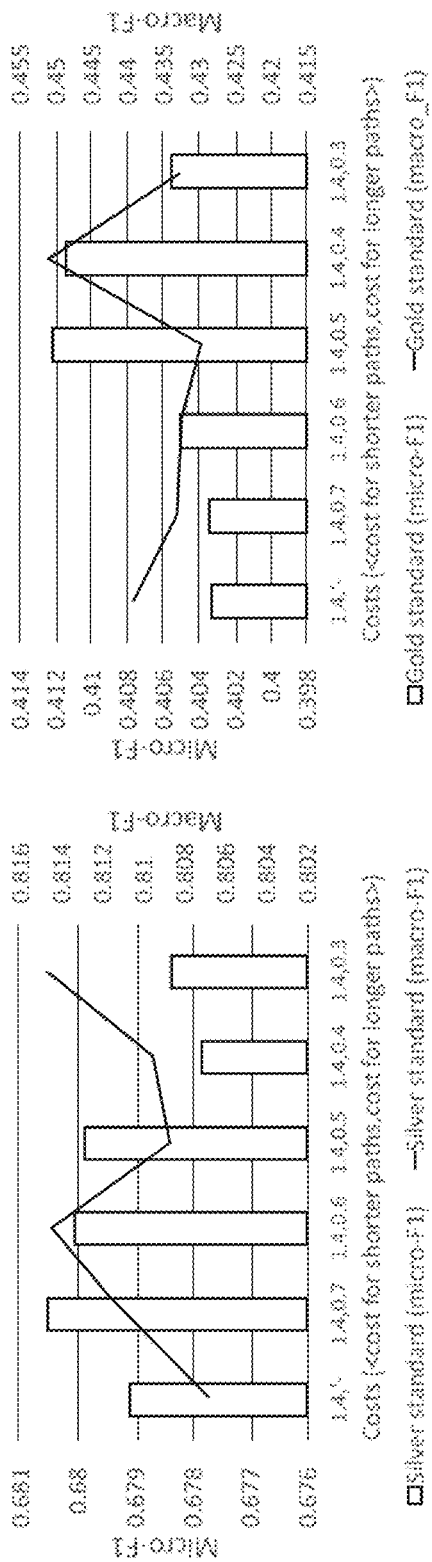
FIG. 8 includes bar graphs illustrating F1 scores for different cost values where misclassifications are related to predicting longer paths than the ones in the training data.

FIG. 7 and FIG. 8 illustrate how the results change per modulation of the value of each of the two costs that have been defined. The Hcls+C$\mathcal{J}$ $\mathcal{L}$ model is used for both FIG. 7 and FIG. 8. FIG. 7 includes F1 scores for different cost values where misclassifications relate to predicting shorter paths than the ones in the training data. FIG. 8 includes F1 scores for different cost values where misclassifications relate to predicting longer paths than the ones in the training data.

Increasing the cost of misclassifications related to predicting shorter paths improves the results on the gold standard, reaching a maximum score at the value of 5.0 for both micro and macro-F1. The scores on the silver standard deteriorate, as the dataset has the same issue as the training data i.e., skewed distribution because of joker classes. As the cost increases, more POIs are re-attributed from head to long-tail classes, causing the drop in the silver standard and the increase in the gold one.

Decreasing the cost of misclassifications related to longer path predictions improves micro-F1 on the gold standard. Top values are reached at costs 0.5 and 0.4. Macro-F1 results are less stable. They decrease up to the cost of 0.5. However, at 0.4 there is a sudden peak, with the model predicting significantly more long-tail categories.

It is noteworthy that both costs not only help but are actually rather complementary. For instance, as shown in Table 3, keeping only the cost related to shorter paths gives high precision scores in both datasets. On the other hand, micro-recall mainly benefits from the cost given to longer paths. On the macro-scores, the latter cost does very well on the silver standard, while the former on the gold standard.

In one example, the combination of the costs <5.0,0.5> results in the best model (best balance of micro and macro-F1 scores) on the gold standard. The model gains 4.89 points on the micro-F1 when compared to the baseline, and 4.14 points compared to the hierarchical model. The improvement reaches respectively 3.98% and 2.88% in macro-F1.

As observed with respect to the results of Table 3, selecting a set of joker classes rather than applying the costs in a class-agnostic manner, results in better micro-F1 and more balanced overall performance. However, as a direct implication of the embodiments, it is natural to assume that most of joker classes should be (1) part of the head categories and (2) located at the top levels of the categorization hierarchy.

Figure 9:
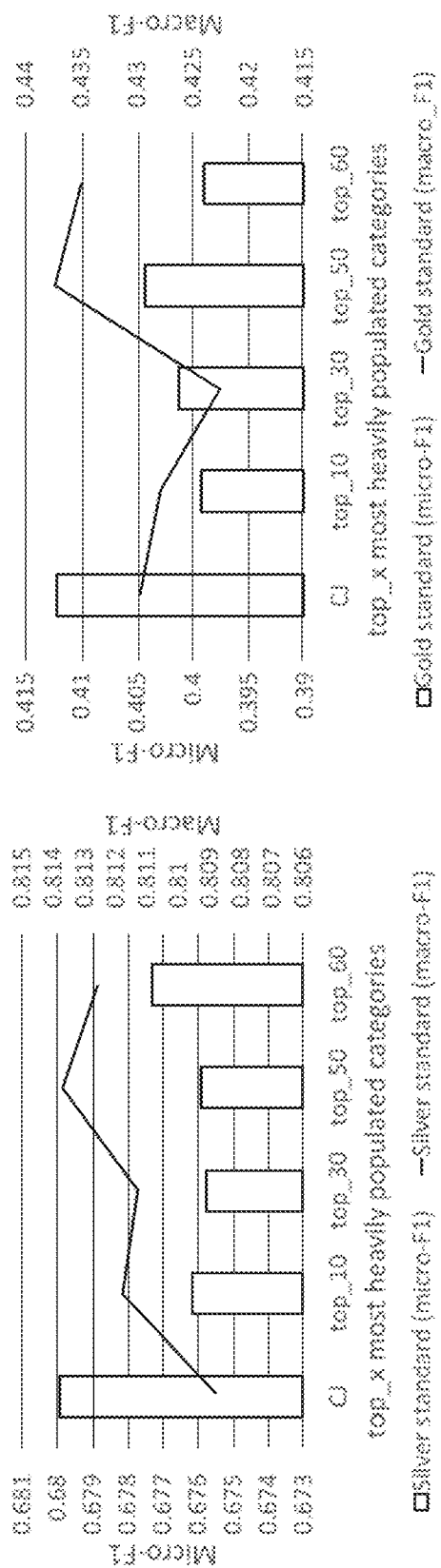
FIG. 9 includes bar graphs illustrating how scores change according to the number of head categories considered as joker classes (i.e., over-represented categories).

FIG. 9 demonstrates how the scores change according to the number of head categories considered as joker classes. Costs <1.4,0.5> were applied to misclassifications in all experiments. As follows, the macro-F1 increases with more categories, reaching a maximum at fifty head categories. At the same point, when compared to the set of categories selected using the above-disclosed Method 1 shown in FIG. 11, the macro-F1 is higher, while the micro-F1 lower. A similar behavior to the joker class-agnostic class model is thus observed, as more POIs are re-attributed to long-tail categories, albeit the absolute scores being better in this case.

Figure 10:
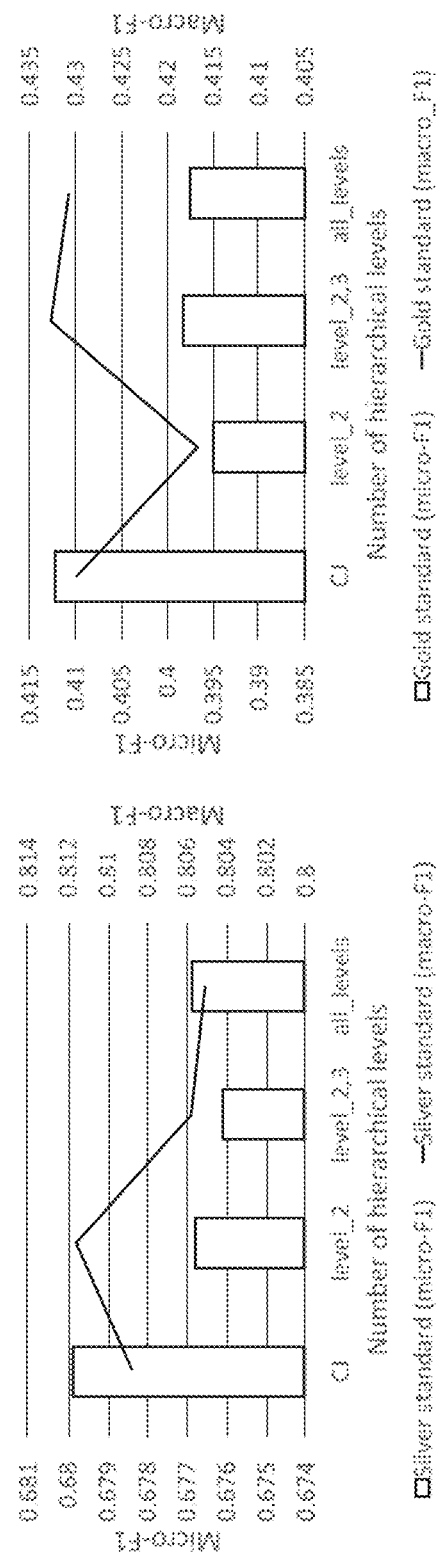
FIG. 10 includes bar graphs illustrating how scores evolve as the hierarchical levels are increased from which categories are extracted.

FIG. 10 illustrates how the scores evolve as the hierarchical levels are increased from which categories are extracted. In more detail, 17 categories are taken from the second level and 903 categories from the third level. It is then observed that as more levels are added, the macro-F1 increases on the gold standard, while the micro-F1 remains relatively unchanged. Compared to using the technique of the joker class-specific cost, micro-F1s are lower in both datasets, while the macro-F1 is slightly higher in the gold standard after the third level of the hierarchy. These results are not surprising, as after the third level, the misclassification costs are applied to significantly more categories (22 categories for $C\mathcal{J}$ and 920 for the level$_2$, 3 model). Thus, the model tends to predict long-tail categories in a stronger fashion. While this results in a small improvement in macro-F1, the decrease in terms of micro-F1 is rather noteworthy. Overall, the Hcls+$C\mathcal{J}\,\mathcal{L}$ model shows a more balanced performance.

In view of the above description, various advantages of the embodiments should be readily apparent to those skilled in the art:

For instance, when classifying hierarchically arranged POIs in a production database with ML-based supervised category prediction, it is unrealistic to count on the existence of a perfectly annotated training set. The embodiments disclose that many of the training labels of the training set tend to be noisy or under-specified (i.e., they point to categories found at higher levels of hierarchy than the correct ones). This precludes straightforward classification. Hence, the embodiments teach a robust learning approach that accommodates for noisy training sets by (1) detecting problematic categories, i.e., over-represented categories, based on the misclassifications of an initial hierarchical classifier, and then (2) re-training the classifier from scratch, introducing a weight to a standard cross-entropy loss function that specifically targets incorrect predictions of the detected categories.

After extensive experiments it has been found that, through use of a gold standard, improvements of up to 4.89% in micro-F1 and 3.98% in macro-F1 are achievable. Predictions based on the embodiments have been used to enable correction of existing annotations in a production database. For example, on the dataset used in the embodiments, more than 11,000 POIs were corrected as a focus was placed on misclassifications with a probability greater than 0.9. Accordingly, it has been found that the resulting classifier may be used not only to impute categories to new POIs, but to curate and correct manually added ones as well.

B.3.(vii) Exemplary Assessments

B.3.(vii)(a) Preliminary Classifiers

As baseline, the flat classifier proposed by Lagos et al., which encodes text using 1-gram character LSTMs, is used. All reported results have been computed on the development dataset disclosed in the description. As transformer-based architectures and sub-word-based representations are state-of-art in NLP (Natural Language Processing), experiments were performed with the fairseq standard transformer-based model (see Ott et al., fairseq: *A Fast, Extensible Toolkit for Sequence Modeling*, In Proceedings of NAACL-HLT 2019: Demonstrations) ["Ott et al."], with and without byte-pair encoding (BPE) (see Sennrich et al., *Neural Machine Translation of Rare Words with Subword Units*, in Proceedings of the 54th Annual Meeting of the Association for Computational Linguistics (Volume 1: Long Papers), Association for Computational Linguistics, Berlin, Germany, 1715-1725 (2016)) pre-processing step for both models [the extension "_bpe" is used in Table 4]. More specifically, Table 4 is a comparison of the fairseq standard transformer-based model Ott et al. and the flat classifier proposed by Lagos et al. based on 1-gram character and BPE LSTMs in the setting described above, where best results are in bold.

TABLE 4

| Model | Micro-prec. | Micro-rec. | Micro-F1 |
|---|---|---|---|
| Transformer | 0.6511 | 0.6511 | 0.6511 |
| Transformer_bpe | 0.6599 | 0.6599 | 0.6599 |
| Lagos et al. [14] | 0.7034 | 0.6338 | 0.6668 |
| Lagos et al. [14]_bpe | 0.6889 | 0.5794 | 0.6294 |

| | Macro-prec. | Macro-rec. | Macro-F1 |
|---|---|---|---|
| Transformer | 0.7561 | 0.7724 | 0.7518 |
| Transformer_bpe | 0.7469 | 0.7679 | 0.7445 |
| Lagos et al. [14] | 0.7619 | 0.7723 | 0.7541 |
| Lagos et al. [14]_bpe | 0.7736 | 0.7479 | 0.7484 |

As shown in Table 4, the results are comparable. Only the results of the final optimal configuration for Lagos et al. are reported here, counting only predictions having a minimum probability threshold of 0.4. It is worth noting that POI attributes in Naver's database are, for the most part, written in Korean (although some multi-script names may be found), and the NFC (form C) unicode normalization format has generally been used.

B.3.(vii)(b) Dataset Details

In Table 5 shows the top ten most popular categories and the percentage of POIs attributed to them in the dataset.

TABLE 5

| Category | POI perc. |
|---|---|
| ‖Korean Food | 15.61% |
| ‖Cafe, Dessert | 5.33% |
| ‖Korean Food‖Meat, Food | 3.92% |
| ‖Cafe, Dessert‖Cafe | 3.86% |
| ‖Chinese Food‖Chinese Restaurant | 3.38% |
| ‖Bar‖Beer, Hof, Pub‖Beer, Hof | 3.27% |
| ‖Chicken dakgangjeong | 2.48% |
| ‖Korean Food‖Seafood‖Sliced Raw Fish‖Sashimi | 2.44% |
| ‖Korean Snack | 2.4% |
| ‖Korean Food‖Meat, Food‖Pork‖Grilled Pork | 1.69% |

These 10 categories account for 44% of all the POIs. The dataset has a very long queue of scarcely used categories, as shown in FIG. 6, with the 461 tail categories having fewer than 5 POIs each. In Table 5, the root category "‖Restaurant"

is common to each class, so it has been omitted for the sake of saving space, and all categories have been translated from Korean into English.

B..3.(vii)(c) Hierarchical and Baseline Models

Table 6 illustrates how the micro and macro scores evolve as more local classifier layers are added to the embodied architecture, in order to take into account more hierarchical levels. More specifically, Table 6 sets out the performance of hierarchical model in the silver standard as more levels of the hierarchy are added. The number in the suffix indicates the levels included in the model. As shown in Table 6 performance degrades as more levels are added. Contrary to state-of-the-art where the addition of hierarchy levels improves results, the results of the disclosed embodiments are comparable or even deteriorate with such addition.

TABLE 6

| Model | Dataset Silver standard Metric | | |
|---|---|---|---|
| | Micro-prec. | Micro-rec. | Micro-F1 |
| $Hcls_2$ | 72.85(±0.26) | 63.90(±0.26) | 68.08(±0.05) |
| $Hcls_{2,3}$ | 73.17(±0.16) | 63.52(±0.26) | 68.00(±0.1) |
| $Hcls_{2,3,4}$ | 73.10(±0.18) | 63.48(±0.25) | 67.95(±0.12) |
| | Macro-prec. | Macro-rec. | Macro-F1 |
| $Hcls_2$ | 80.29(±0.18) | 82.23(±0.51) | 80.08(±0.32) |
| $Hcls_{2,3}$ | 78.69(±0.62) | 80.66(±0.82) | 78.44(±0.69) |
| $Hcls_{2,3,4}$ | 76.97(±0.86) | 78.52(±0.95) | 76.51(±0.87) |

The following Table 7 illustrates accordingly the evolution of the scores on the gold standard. More specifically, Table 7 shows performance of hierarchical model on the gold standard as more levels of the hierarchy are added. The number in the suffix indicates the levels included in the model. As shown in Table 7, no improvement is observed contrary to findings in related work.

TABLE 7

| Model | Dataset Gold standard Metric | | |
|---|---|---|---|
| | Micro-prec. | Micro-rec. | Micro-F1 |
| $Hcls_2$ | 50.32(±1.14) | 31.99(±0.46) | 39.11(±0.58) |
| $Hcls_{2,3}$ | 49.92(±1.02) | 31.74(±0.48) | 38.80(±0.61) |
| $Hcls_{2,3,4}$ | 50.78(±0.82) | 32.03(±1.49) | 39.26(±1.19) |
| | Macro-prec. | Macro-rec. | Macro-F1 |
| $Hcls_2$ | 49.66(±1.69) | 38.38(±1.10) | 40.92(±1.33) |
| $Hcls_{2,3}$ | 48.72(±1.84) | 38.20(±1.09) | 40.47(±1.43) |
| $Hcls_{2,3,4}$ | 48.19(±1.52) | 37.46(±1.1) | 39.78(±1.18) |

Tables 8 and 9 below illustrate the results of the flat classifier-based models on the silver and gold standards. More specifically, Tables 8 and 9 show average performance (%) over 5 runs on the silver and gold standards of the flat classifier-based models, respectively. Standard deviation is also reported in Tables 8 and 9. As in the hierarchical case, the disclosed flat models achieve the best results in both the silver and gold standards when compared to the rest flat classifiers. Note, however, that absolute scores of all models are lower than in the hierarchical case.

TABLE 8

| Model | Dataset Gold standard Metric | | |
|---|---|---|---|
| | Micro-prec. | Micro-rec. | Micro-F1 |
| Base | 46.57(±2.02) | 32.62(±0.47) | 38.36(±0.88) |
| Base + Focal | 46.77(±2.23) | 32.69(±1.33) | 38.48(±1.67) |
| Base + Focal-cb | 47.67(±1.34) | 33.42(±0.82) | 39.29(±0.98) |
| Base + C$\mathcal{L}$ | 50.52(±0.74) | 33.31(±0.7) | 40.14(±0.45) |
| Base + CJ$\mathcal{L}_{1.4, 0.5}$ | 49.76(±0.73) | 33.8(±0.58) | 40.25(±0.48) |
| | Macro-prec. | Macro-rec. | Macro-F1 |
| Base | 47.75(±1.6) | 37.80(±1.39) | 39.82(±1.33) |
| Base + Focal | 46.91(±1.83) | 36.82(±0.57) | 39.15(±0.77) |
| Base + Focal-cb | 47.80(±0.45) | 38.13(±0.66) | 40.26(±0.67) |
| Base + C$\mathcal{L}$ | 50.13(±1.7) | 40.42(±1.62) | 42.49(±1.60) |
| Base + CJ$\mathcal{L}_{1.4, 0.5}$ | 48.38(±1.23) | 40.26(±1.22) | 41.99(±1.23) |

TABLE 9

| Model | Dataset Silver standard Metric | | |
|---|---|---|---|
| | Micro-prec. | Micro-rec. | Micro-F1 |
| Base | 70.41(±0.27) | 63.78(±0.26) | 66.93(±0.2) |
| Base + Focal | 70.09(±0.16) | 63.56(±0.17) | 66.67(±0.08) |
| Base + Focal-cb | 70.22(±0.21) | 63.56(±0.16) | 66.73(±0.07) |
| Base + C$\mathcal{L}$ | 71.15(±0.21) | 62.88(±0.19) | 66.76(±0.11) |
| Base + CJ$\mathcal{L}_{1.4, 0.5}$ | 70.94(±0.36) | 63.63(±0.13) | 67.08(±0.13) |
| | Macro-prec. | Macro-rec. | Macro-F1 |
| Base | 79.18(±1.00) | 80.38(±0.86) | 78.72(±0.91) |
| Base + Focal | 78.20(±0.68) | 78.50(±0.76) | 77.28(±0.72) |
| Base + Focal-cb | 78.32(±0.24) | 79.01(±0.48) | 77.60(±0.36) |
| Base + C$\mathcal{L}$ | 80.00(±0.15) | 81.62(±0.81) | 79.70(±0.14) |
| Base + CJ$\mathcal{L}_{1.4, 0.5}$ | 79.97(±0.31) | 81.46(±0.63) | 79.64(±0.45) |

C. General

In one embodiment there is disclosed a method implemented with one or more processors for improving classification of labels and categories of a database stored in memory that includes a set of labels and a set of categories where (1) each label in the set of labels points to at least one of the categories in the set of categories, and (2) each label in the set of labels is associated with a hierarchical category path. The one or more processors applying both a subset of the set of labels and a subset of the set of categories of the database stored in the memory to a first classifier for classifying the subset of labels with respect to the subset of categories, the first classifier including a first loss function, and determining, based on applying both the subset of labels and the subset of categories to the first classifier, whether at least one label in the subset of labels of the database stored in the memory has been misclassified. In response to determining that at least one label in the subset of labels of the database stored in the memory has been misclassified based on applying both the subset of labels and the subset of categories to the first classifier: the one or more processors changing the first loss function of the first classifier to a second loss function to form a second classifier including the second loss function, and applying both the subset of labels and the subset of categories to the second classifier for classifying the subset of labels with respect to the subset of categories of the database stored in the memory for improving its classification of labels and categories.

In one example, the first loss function comprises a global categorical cross-entropy loss function, and wherein changing the first loss function to the second loss function comprises changing the global categorical cross-entropy loss function to a weighted-by-sample categorical cross entropy loss function.

In another example, the weighted-by-sample categorical cross entropy loss function includes:

$$\mathcal{L}'_G = \frac{1}{N}\sum_{i=1}^{N} a_{\hat{y}_i,y_i} \mathcal{L}_{G,i}$$

where:

$\mathcal{L}_{G,i}$ is the global catigorical cross-entory loss for sample i and $$a_{\hat{y}_i,y_i} = \begin{cases} a_{shorter}, & \text{if } \hat{t}_i. \text{ prefix\_path\_of } (t'_i) \\ a_{longer}, & \text{if } t'_i. \text{ prefix\_path\_of } (\hat{t}_i) \\ 1, & \text{otherwise} \end{cases}$$

$\hat{t}_i$ is the path corresponding to the $\hat{y}_i$ prediction;
$t_i'$ is the observed path corresponding to $y_i$;
$a_{shorter}$ denotes the cost of predicting a shorter path than an observed one; and
$a_{longer}$ denotes the cost of predicting a longer path than the observed one.

In yet other examples: the cost assigned to $a_{shorter}$ is greater than the cost assigned to $a_{longer}$; each one of the first classifier and second classifier comprises a hybrid hierarchical classifier with the hybrid hierarchical classifier including a global classifier and at least one local classifier; the global classifier includes a loss, and wherein changing the first loss function in the first classifier to the second loss function in the second classifier comprises introducing a weight to the global classifier's loss; the determining determines that at least one label in the subset of labels has been misclassified using a probability threshold; the labels and categories relate to points-of-interest; the applying both the subset of labels and the subset of categories to the second classifier enables correction of the at least one label in the subset of labels that has been determined to be misclassified.

In another embodiment there is disclosed a method implemented with one or more processors for improving classification of labels and categories of a database stored in memory that includes a set of labels and a set of categories where (1) each label in the set of labels points to at least one of the categories in the set of categories, (2) the labels in the set of labels are disposed in a label hierarchy with both the labels and the categories being arranged throughout a plurality of levels, and (3) each label in the set of labels is associated with a path. The one or more processors applying both a subset of the set of labels and a subset of the set of categories of the database stored in the memory to a first classifier for classifying the subset of labels with respect to the subset of categories, the first classifier including a first loss function, and determining, based on applying both the subset of labels and the subset of categories to the first classifier, whether at least one label in the subset of labels of the database stored in the memory has a path terminating at a category found at one of the levels in the label hierarchy, and whether the at least one label in the subset of labels of the database stored in the memory corresponds to an over-represented category. In response to determining that at least one label in the subset of labels of the database stored in the memory has a path terminating at a category found at one of the levels in the label hierarchy, and that the at least one label in the subset of labels of the database stored in the memory corresponds to an over-represented category: the one or more processors changing the first loss function of the first classifier to a second loss function to form a second classifier including the second loss function, and applying both the subset of labels and the subset of categories to the second classifier for classifying the subset of labels with respect to the subset of categories of the database stored in the memory for improving its classification of labels and categories.

In other examples: the determining determines using a maximum hierarchy depth to preclude consideration of misclassifications at the lower level in the label hierarchy; the determining determines using a maximum hierarchy depth to preclude consideration of misclassifications at the lower level in the label hierarchy; the labels and categories relate to points-of-interest and wherein the database includes maps.

In yet other embodiments: a computer program product comprising code instructions which, when said program is executed on a computer, cause the computer to perform one or more of the methods above; a computer-readable medium having stored thereon the computer program product; and/or a data processing device comprising one or more processors configured to perform one or more of the methods above.

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure. All documents cited herein are hereby incorporated by reference in their entirety, without an admission that any of these documents constitute prior art.

The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The systems and methods described in this application may be partially or fully implemented by a special-purpose computer created by configuring a general-purpose computer to execute one or more particular functions embodied in computer programs implementing the methods described above. The functional blocks, flowchart components, and other elements described above serve as software specifications, which may be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A method implemented with one or more processors for improving classification of labels and categories of a database stored in memory that includes a set of labels and a set of categories where (1) each label in the set of labels points to at least one of the categories in the set of categories, and (2) each label in the set of labels is associated with a hierarchical category path, comprising:
the one or more processors applying both a subset of the set of labels and a subset of the set of categories of the database stored in the memory to a first classifier for classifying the subset of labels with respect to the subset of categories, the first classifier including a first loss function;
the one or more processors determining, based on said applying both the subset of labels and the subset of categories to the first classifier, whether at least one label in the subset of labels of the database stored in the memory has been misclassified;
in response to said determining that at least one label in the subset of labels of the database stored in the memory has been misclassified based on said applying both the subset of labels and the subset of categories to the first classifier:
the one or more processors changing the first loss function of the first classifier to a second loss function to form a second classifier including the second loss function, and
the one or more processors applying both the subset of labels and the subset of categories to the second classifier for classifying the subset of labels with respect to the subset of categories of the database stored in the memory for improving the second classifier's classification of labels and categories;
wherein the first loss function comprises a global categorical cross-entropy loss function, and wherein said changing the first loss function to the second loss function comprises changing the global categorical cross-entropy loss function to a weighted-by-sample categorical cross entropy loss function; and
wherein the weighted-by-sample categorical cross entropy loss function comprises:

$$\mathcal{L}'_G = \frac{1}{N}\sum_{i=1}^{N} a_{\hat{y}_i,y_i}\mathcal{L}_{G,i}$$

where:
$\mathcal{L}_{G,i}$ is the global catigorical cross-entorty loss for sample i and $$a_{\hat{y}_i,y_i} = \begin{cases} a_{shorter}, & \text{if } \hat{t}. \text{ prefix\_path\_of } (t'_i) \\ a_{longer}, & \text{if } t'_i. \text{ prefix\_path\_of } (\hat{t}_i) \cdot \\ 1, & \text{otherwise} \end{cases}$$

$\hat{t}_i$ is the path corresponding to the $\hat{y}_i$ prediction;
$t_i'$ is the observed path corresponding to $y_i$;
$a_{shorter}$ denotes the cost of predicting a shorter path than an observed one; and
$a_{longer}$ denotes the cost of predicting a longer path than the observed one.

2. The method of claim 1, wherein the cost assigned to $a_{shorter}$ is greater than the cost assigned to $a_{longer}$.

3. A method implemented with one or more processors for improving classification of labels and categories of a database, comprising:
the one or more processors storing in memory the labels and categories of the database that includes a set of labels and a set of categories where (1) each label in the set of labels points to at least one of the categories in the set of categories, (2) the labels in the set of labels are disposed in a label hierarchy with both the labels and the categories being arranged throughout a plurality of levels, and (3) each label in the set of labels is associated with a path;
the one or more processors applying both a subset of the set of labels and a subset of the set of categories of the database stored in the memory to a first classifier for classifying the subset of labels with respect to the subset of categories, the first classifier including a first loss function;
the one or more processors determining, based on said applying both the subset of labels and the subset of categories to the first classifier, whether at least one label in the subset of labels of the database stored in the memory has a path terminating at a category found at one of the levels in the label hierarchy, and whether the at least one label in the subset of labels of the database stored in the memory corresponds to an over-represented category; and
in response to said determining that at least one label in the subset of labels of the database stored in the memory has a path terminating at a category found at one of the levels in the label hierarchy, and that the at least one label in the subset of labels of the database stored in the memory corresponds to an over-represented category:
the one or more processors changing the first loss function of the first classifier to a second loss function to form a second classifier including the second loss function, and
the one or more processors applying both the subset of labels and the subset of categories to the second classifier for classifying the subset of labels with respect to the subset of categories of the database stored in the memory for improving the second classifier's classification of labels and categories.

4. The method of claim 3, wherein the first loss function comprises a global categorical cross-entropy loss function, and wherein said changing the first loss function to the second loss function comprises changing the global categorical cross-entropy loss function to a weighted-by-sample categorical cross entropy loss function.

5. The method of claim 3, wherein the labels and categories relate to points-of-interest and wherein the database includes maps.

6. The method of claim 3, wherein each one of the first classifier and second classifier comprises a hybrid hierarchical classifier with the hybrid hierarchical classifier including a global classifier and at least one local classifier.

7. The method of claim 6, wherein the global classifier includes a loss, and wherein said changing the first loss function in the first classifier to the second loss function in the second classifier includes introducing a weight to the global classifier's loss.

8. The method of claim 3, wherein said determining determines that at least one label in the subset of labels has been misclassified using a probability threshold.

9. The method of claim 3, wherein the labels and categories relate to points-of-interest.

10. The method of claim 3, wherein said applying both the subset of labels and the subset of categories to the second classifier enables correction of the at least one label in the subset of labels that has been determined to be misclassified.

11. The method of claim 3, wherein said applying both the subset of labels and the subset of categories to the second classifier imputes labels for new points-of-interest.

12. The method of claim 3, where the plurality of levels includes a lower level and a higher level, and wherein said determining includes determining that the at least one of the labels in the subset of labels has a path terminating at a category found at the higher level in the label hierarchy.

13. The method of claim 12, wherein said determining determines using a maximum hierarchy depth to preclude consideration of misclassifications at the lower level in the label hierarchy.

14. A method implemented with one or more processors for improving classification of labels and categories of a database stored in memory that includes a set of labels and a set of categories where (1) each label in the set of labels points to at least one of the categories in the set of categories, (2) the labels in the set of labels are disposed in a label hierarchy with both the labels and the categories being arranged throughout a plurality of levels, and (3) each label in the set of labels is associated with a path, comprising:

the one or more processors applying both a subset of the set of labels and a subset of the set of categories of the database stored in the memory to a first classifier for classifying the subset of labels with respect to the subset of categories, the first classifier including a first loss function;

the one or more processors determining, based on said applying both the subset of labels and the subset of categories to the first classifier, whether at least one label in the subset of labels of the database stored in the memory has a path terminating at a category found at one of the levels in the label hierarchy, and whether the at least one label in the subset of labels of the database stored in the memory corresponds to an over-represented category; and in response to said determining that at least one label in the subset of labels of the database stored in the memory has a path terminating at a category found at one of the levels in the label hierarchy, and that the at least one label in the subset of labels of the database stored in the memory corresponds to an over-represented category:

the one or more processors changing the first loss function of the first classifier to a second loss function to form a second classifier including the second loss function, and the one or more processors applying both the subset of labels and the subset of categories to the second classifier for classifying the subset of labels with respect to the subset of categories of the database stored in the memory for improving the second classifier's classification of labels and categories;

wherein the first loss function comprises a global categorical cross-entropy loss function, and wherein said changing the first loss function to the second loss function comprises changing the global categorical cross-entropy loss function to a weighted-by-sample categorical cross entropy loss function; and wherein the weighted-by-sample categorical cross entropy loss function comprises:

$$\mathcal{L}'_G = \frac{1}{N}\sum_{i=1}^{N} a_{\hat{y}_i, y_i} \mathcal{L}_{G,i}$$

where:

$\mathcal{L}_{G,i}$ is the global catigorical cross-entorty loss for sample i and $$a_{\hat{y}_i, y_i} = \begin{cases} a_{shorter}, & \text{if } \hat{t}_i \cdot \text{prefix\_path\_of } (t'_i) \\ a_{longer}, & \text{if } t'_i \cdot \text{prefix\_path\_of } (\hat{t}_i) \cdot \\ 1, & \text{otherwise} \end{cases}$$

$\hat{t}_i$ is the path corresponding to the $\hat{y}_i$ prediction;

$t_i'$ is the observed path corresponding to $y_i$;

$a_{shorter}$ denotes the cost of predicting a shorter path than an observed one; and $a_{longer}$ denotes the cost of predicting a longer path than the observed one.

\* \* \* \* \*